F. BERGIUS.
APPARATUS FOR THE MANUFACTURE OF HYDROGEN.
APPLICATION FILED AUG. 26, 1912.
1,059,817.
Patented Apr. 22, 1913.
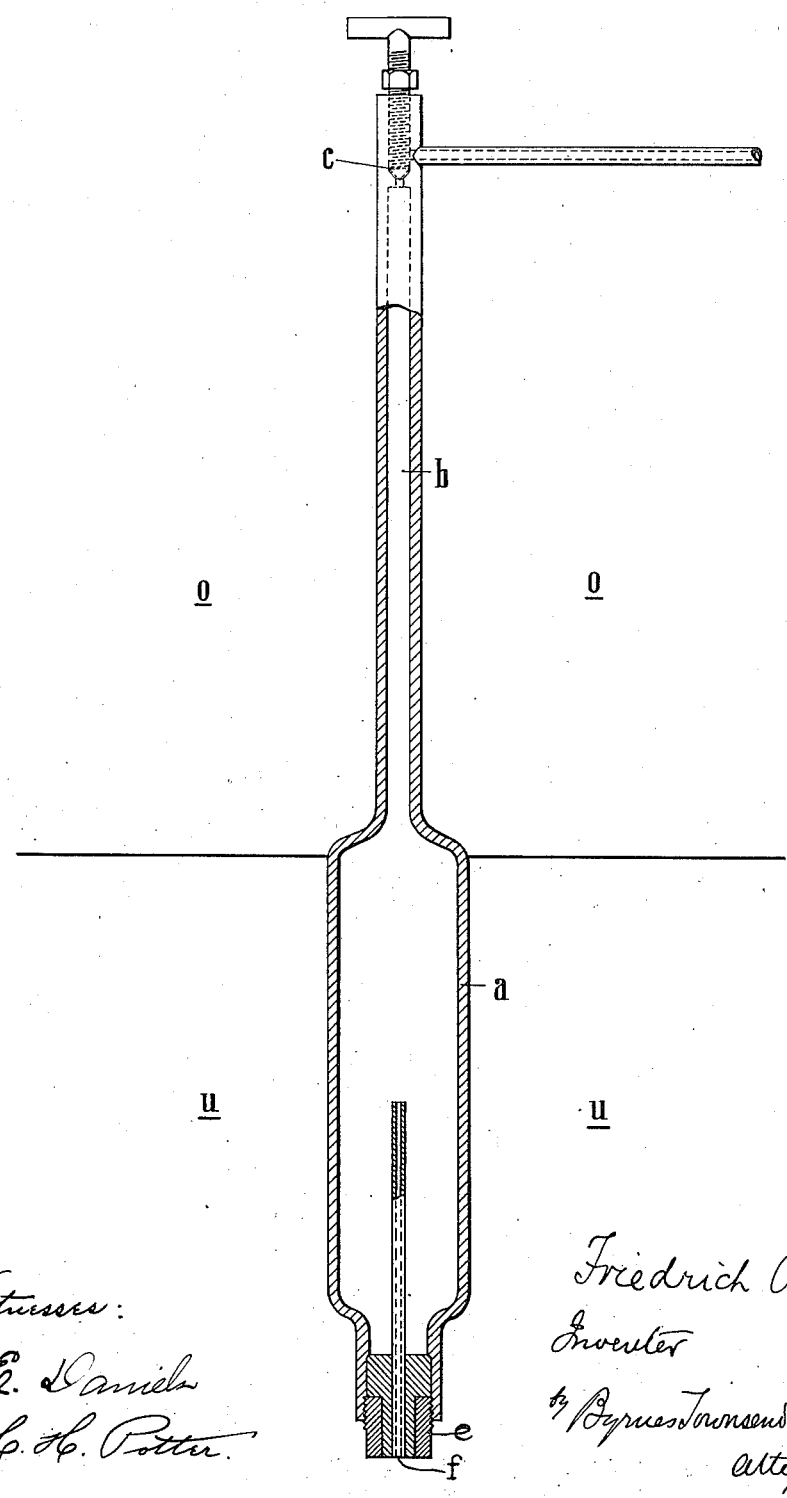

UNITED STATES PATENT OFFICE.

FRIEDRICH BERGIUS, OF HANOVER, GERMANY.

APPARATUS FOR THE MANUFACTURE OF HYDROGEN.

1,059,817.  Specification of Letters Patent.  Patented Apr. 22, 1913.

Application filed August 26, 1912. Serial No. 717,201.

*To all whom it may concern:*

Be it known that I, FRIEDRICH BERGIUS, a citizen of the German Empire, residing at Hanover, Germany, have invented certain new and useful Improvements in Apparatus for the Manufacture of Hydrogen, of which the following is a specification.

This invention relates to an apparatus for the manufacture of hydrogen in accordance with the specification filed August 26, 1912, Serial No. 717,202.

In the closed vessel in which water, heated in a liquid state to a point beyond the boiling point, is acting on the metals, there is produced, in addition to hydrogen, steam, from which the hydrogen must be separated if it is not desired to evaporate in a useless manner quantities of water and thus suffer losses of heat. In order to discharge from the heated apparatus the hydrogen generated, without any steam, above the reaction chamber is arranged a gas chamber maintained at a lower temperature, in which the steam rising with the hydrogen, is condensed, while the hydrogen gradually completely fills the chamber and prevents any further admission of steam, as it is in highly compressed state. The blow off valve for the hydrogen is at a point at which the pure hydrogen has collected.

The invention is explained in the drawing showing diagrammatically the apparatus.

The reaction vessel $a$ which is preferably made of compressed steel, like carboys, and in the surrounding space $u$ of which there is a temperature of about 300° C., is adjoined at the top by a gas chamber $b$, the surrounding space of which is maintained in any desired manner at a lower temperature. A removable plug $e$ through which passes a tube $f$ closes the bottom of the vessel. Iron or a low iron oxid or in some cases a more precious metal, for instance copper, may be inserted in the vessel on removing plug $e$, and water in which may be dissolved an electrolyte such as common salt, iron chlorid, small quantities of hydrochloric acid, are introduced into the vessel through the tube $f$. The mixture of steam and hydrogen rising from the tank $a$, rises in the tube $b$ in which the steam is condensed and drips back into the vessel $a$ in liquid form. As the process is going on, more and more hydrogen collects in that way in the chamber $b$, which hydrogen is at a high pressure up to more than 100 atmospheres.

The blow off valve is at $c$.

What I claim is:—

An apparatus for manufacturing hydrogen, comprising a bulb-shaped retort, a closure in the bottom constituting means to admit material to be acted upon, means through said closure to admit a hydrogen-containing fluid, a condensing extension projecting upwardly from said retort, an outlet pipe from said extension, and a valve closing said extension and outlet pipe.

In testimony whereof I affix my signature in presence of two witnesses.

FRIEDRICH BERGIUS.

Witnesses:
 T. HENDY REED,
 G. NOEL SIDDON.